(12) United States Patent
So et al.

(10) Patent No.: US 11,255,656 B2
(45) Date of Patent: Feb. 22, 2022

(54) PHASE CANCELLATION MICROSCOPY

(71) Applicant: Massachusetts Institute of Technology, Cambridge, MA (US)

(72) Inventors: Peter T. C. So, Boston, MA (US); Zahid Yaqoob, Cambridge, MA (US); Dominika Lyzwa, Boston, MA (US); Vijay Singh, Arlington, MA (US); Dushan N. Wadduwage, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/140,558

(22) Filed: Jan. 4, 2021

(65) Prior Publication Data

US 2021/0270595 A1    Sep. 2, 2021

Related U.S. Application Data

(60) Provisional application No. 62/983,800, filed on Mar. 2, 2020.

(51) Int. Cl.
*G01B 9/02* (2006.01)
*G02B 21/36* (2006.01)
(Continued)

(52) U.S. Cl.
CPC ..... *G01B 9/02057* (2013.01); *G01B 9/02067* (2013.01); *G01B 9/02081* (2013.01);
(Continued)

(58) Field of Classification Search
CPC ............ G01B 9/02057; G01B 9/02067; G01B 9/02081; G02B 21/0056; G02B 21/361
See application file for complete search history.

(56) References Cited

U.S. PATENT DOCUMENTS 10,564,042 B1    2/2020  Redding et al.
2013/0181143 A1  7/2013  Betzig et al.
(Continued)

OTHER PUBLICATIONS

Nikolenko, Volodymyr et al. "Spatial Light Modulator Microscopy". Cold Spring Harb Protoc; 2013; doi: 10.1101/pdb.top079517, pp. 1132-1141. (Year: 2013).*
(Continued)

*Primary Examiner* — Michael A Lyons
(74) *Attorney, Agent, or Firm* — Smith Baluch LLP (57) ABSTRACT

Our high phase sensitivity wide-field phase cancellation interferometry system allows single-shot, label-free optical sensing of neural action potentials via imaging of optical path length changes. Single-shot sensing and monitoring of single neurons within a neural network should lead to a more comprehensive understanding neural network processing, which is beneficial for the advancement in the field of neuroscience as well as its biomedical applications and impact. Our system cancels the phase profile of the resting neuron from the phase profile of the spiking neuron, improving the sensitivity by two orders of magnitude. Using a detector with an extremely large well depth and an appropriately biased interferometer increases the sensitivity by another order of magnitude, yielding a measurement that is three orders of magnitude more sensitive than those possible with other microscopes.

20 Claims, 8 Drawing Sheets

(51) Int. Cl.
  G06N 3/067    (2006.01)
  G02B 21/00    (2006.01)
  G01B 9/02056  (2022.01)
  G01B 9/02055  (2022.01)
(52) U.S. Cl.
  CPC ....... *G02B 21/0056* (2013.01); *G02B 21/361* (2013.01); *G06N 3/0675* (2013.01)

(56) References Cited

U.S. PATENT DOCUMENTS

| | | | |
|---|---|---|---|
| 2015/0004637 A1* | 1/2015 | Cohen | G02B 21/367 435/29 |
| 2015/0233820 A1* | 8/2015 | Roke | G01N 15/1434 356/338 |
| 2015/0330892 A1* | 11/2015 | Cerignoli | H04N 5/247 348/79 |
| 2018/0224644 A1 | 8/2018 | Ji et al. | |
| 2020/0069233 A1* | 3/2020 | Xu | G02B 21/0032 |
| 2020/0342205 A1* | 10/2020 | Park | G02B 21/16 |

OTHER PUBLICATIONS

Packer, Adam M. et al. "Simultaneous all-optical manipulation and recording of neural circuit activity with cellular resolution in vivo". Nature Methods, vol. 12, No. 2, Feb. 2015, pp. 140-146. (Year: 2015).*

Shtrahman, Matthew et al. "Multifocal Fluorescence Microscope for Fast Optical Recordings of Neuronal Action Potentials". Biophysical Journal, vol. 108, No. 3, Feb. 2015, pp. 520-529. (Year: 2015).*

Akkin et al., "Detection of neural action potentials using optical coherence tomography: intensity and phase measurements with and without dyes." Frontiers in Neuroenergetics 2 (2010): 22. 10 pages.

Batabyal et al., "Label-free optical detection of action potential in mammalian neurons." Biomedical Optics Express 8.8 (2017): 3700-3713.

Cohen et al., "Light scattering and birefringence changes during nerve activity." Nature 218.5140 (1968): 438-441.

Cohen, "Changes in neuron structure during action potential propagation and synaptic transmission." Physiological Reviews 53.2 (1973): 373-418.

Hosseini et al., "Pushing phase and amplitude sensitivity limits in interferometric microscopy." Optics Letters 41.7 (2016): 1656-1659.

International Search Report and Written Opinion in International Patent Application No. PCT/US2021/012058 dated Mar. 23, 2021, 16 pages.

Ling et al., "Full-field interferometric imaging of propagating action potentials." Light: Science & Applications 7.1 (2018): 1-11.

Ling et al., "High-speed interferometric imaging reveals dynamics of neuronal deformation during the action potential", Proceedings of the National Academy of Sciences, 0027-8424 (2020). 8 pages.

Popescu et al., "Diffraction phase microscopy for quantifying cell structure and dynamics", Optics Letters, 31(6), pp. 775-777 (2006).

* cited by examiner

FIG. 1A
neuron's phase profile

FIG. 1B
deformable mirror / spatial filter arrangement

FIG. 1C
flat optical wavefront

PHASE CANCELLATION MICROSCOPY

CROSS-REFERENCE TO RELATED APPLICATION(S)

This application claims the priority benefit, under 35 U.S.C. § 119(e), of U.S. Application No. 62/983,800, filed on Mar. 2, 2020, which is incorporated herein by reference in its entirety.

GOVERNMENT SUPPORT

This invention was made with Government support under Grant No. P41 EB015871 awarded by the National Institutes of Health (NIH). The Government has certain rights in the invention.

BACKGROUND

Understanding the human brain requires understanding neural network processing. To capture the spiking activity of a neural network, optical measurements have several advantages over electrical recordings. Optical measurements allow us to visualize the neuron and entire neural network, and hence can inform us about the neurons' relative positions. Furthermore, the activity of a neural network can be measured optically with a finer spatial resolution than with electrical measurements, which have a spatial resolution limited by the configuration of the recording electrode array. Optical methods also present the possibility to quantify neural activity in a label-free fashion.

Label-free optical imaging techniques, such as those based on light scattering and birefringence, have been used before for detecting neural activity. Wide-field interferometric microscopy has also been used for detecting neural activity. These and other techniques are possible thanks to changes in a neuron's light scattering, absorption, birefringence, fluorescence, membrane motion, and refractive index during an action potential. Unfortunately, current interferometric systems are limited by their low phase measurement sensitivity. At current phase sensitivity limits of about $10^{-3}$ rad, interferometry is not sensitive enough to allow single-shot measurements of neuron action potentials.

SUMMARY

Without being bound by any particular theory, a theoretical analysis of the optical wavefronts suggests that the low signal-to-background ratio (SBR) of current interferometric systems limits their phase sensitivity to about $10^{-3}$ rad. Increasing the well depth of the camera from about 20,000-60,000 electrons for current interferometric phase microscopes to 1,000,000 electrons or more can improve the phase sensitivity by about one order of magnitude, which is beneficial but not sufficient to image a neuronal action potential in real-time. The microscope sensitivity can be improved even more by utilizing the full dynamic range of the camera to measure the dynamic phase changes associated with the action potential. This can be achieved by canceling the overall sample phase, when no action potential occurs, using a phase cancellation device, such as a deformable mirror or a spatial light modulator (SLM). If the overall sample phase is canceled, the signal detected by the camera represents the phase difference between the normalized, non-spiking neuron and the neuron when an action potential occurs. This captured phase difference is due to the change in the neuron's refractive index and movement of the neuron membrane during an action potential.

Our phase-cancellation microscopy offers sensitivity good enough and temporal and spatial resolution fine enough for single-shot optical sensing of neural action potentials via imaging of optical path length changes. Our phase-cancellation microscope can acquire phase images with a sensitivity of up to $10^{-4}$ rad to $10^{-6}$ rad, which is three orders of magnitude more sensitive than other phase microscopes, thanks to cancellation of the spatial phase evoked by the resting neuron and the use of a detector with a very large well depth (e.g., $10^6$ electrons). The phase is cancelled using a phase cancellation device (e.g., a spatial light modulator), which imparts a phase based on a measurement of the resting neuron.

An inventive phase-cancellation microscope includes a light source, a spatial phase modulator (e.g., an SLM or deformable mirror), a beam-splitting element (e.g., a Wollaston prism, beam splitter, or diffractive optical element), a phase modulator, and a detector. In operation, the light source illuminates a neuron exhibiting an action potential. The spatial phase modulator, which is in optical communication with the neuron, modulates a wavefront of light transmitted by the neuron with a spatial phase modulation selected to cancel spatial phase modulation of the wavefront by the neuron in the absence of the action potential. The beam-splitting element, which is in optical communication with the spatial phase modulator, splits the wavefront into a first beam and a second beam. The phase modulator, which is in optical communication with the beam-splitting element, modulates a relative phase between the first beam and the second beam. And the detector, which is in optical communication with the phase modulator, detects interference between the first beam and the second beam. This interference represents the action potential.

The beam-splitting element can form part of a common-path interferometer. In this case, the microscope may also include a spatial filter (e.g., a low-pass spatial filter), in optical communication with at least one component of the common-path interferometer, to spatially filter the first beam. The phase modulator can be configured to set a relative phase between the first beam and the second beam to an absolute value of between $|\pi \pm 10 \text{ μrad}|$ and $|\pi \pm 10 \text{ mrad}|$. The detector can have a well depth of at least 1 million electrons per pixel and can operate at a frame rate of 1 kHz to 20 kHz. And the microscope can also include a probe, in electromagnetic communication with the neuron, to stimulate the neuron to exhibit the action potential.

Another inventive phase-cancellation microscope may include a continuous-wave laser, a spatial phase modulator (e.g., an SLM or deformable mirror), a common-path interferometer, and a detector. In operation, the continuous-wave laser illuminates a neuron exhibiting an action potential with a continuous-wave laser beam. The spatial phase modulator, which is in optical communication with the neuron, modulates a wavefront of the continuous-wave laser beam transmitted by the neuron with a spatial phase modulation selected to cancel spatial phase modulation of the wavefront by the neuron in the absence of the action potential. The common-path interferometer is in optical communication with the spatial phase modulator and includes a beam-splitting element (e.g., a Wollaston prism, beam splitter, or diffractive optical element), a phase modulator, and a spatial filter. The beam-splitting element to split the continuous-wave laser beam into a first beam and a second beam. The phase modulator set a relative phase between the first beam and the second beam to an absolute value of between $|\pi \pm 0.1$ mrad| and |π±5 mrad|. The spatial filter is in one arm of the common-path interferometer and spatially low-pass filters the first beam. The detector is in optical communication with the common-path interferometer and has a well depth of at least $10^6$ electrons per pixel and a frame rate of at least 1 kHz. It detects interference between the first beam and the second beam that represents a phase change of about 1 µrad to about 0.1 mrad caused by the action potential. The microscope may also include a probe, in electromagnetic communication with the neuron, to stimulate the neuron to exhibit the action potential.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Action potentials are generated in excitable cells. Neural cells produce propagating action potentials to transmit information. At rest, a neuron typically has a cell membrane potential of about −70 mV. An action potential (a 'spike') is a temporary change in the neuron's membrane potential. If the neuron's membrane potential rises to a certain threshold, typically about −55 mV, voltage-gated ion channels in the cell membrane open, causing positively charged ions to flow into the neuron and flipping the neuron's membrane potential from negative to positive. The membrane potential usually peaks at around +40 mV. Then these voltage-gated ion channels close and another type of ion channel opens, causing the membrane potential to decrease as positive ions leave the neuron. The membrane potential dips below its resting value for a brief (e.g., about 1 ms to 2 ms) refractory period, then returns to its resting value until a next triggering event occurs.

Changes in the neuron's optical thickness, caused by nanometer-scale cellular deformations, accompany the neuron's action potential. These changes are too small—corresponding typically to about 1 µrad to about 0.1 mrad—to be detected using conventional interferometric imaging techniques without averaging over many action potentials. Averaging over many action potentials suppress or removes noise but defies the purpose of neural sensing. Only single-shot read-out can accurately record the neuron's activity.

Our phase-cancellation microscope is sensitive enough for single-shot optical imaging of an action potential. It uses a laser or other coherent light source to illuminate a neuron with a beam of coherent light. As this beam propagates through the neuron, its optical wavefront undergoes an amplitude and spatial phase modulation. The beam exits the neuron and is split into first and second beams that propagate through first and second arms of an interferometer. The first and second beams interfere at the output of the interferometer to produce a spatial interference pattern whose amplitude encodes the spatial phase modulation imparted by the neuron. This spatial phase modulation is specific to each neuron and varies depending on the neuron's state, i.e., whether the neuron is spiking or not.

Our phase-cancellation microscope measures the spatial phase modulation elicited by an action potential by canceling the background spatial phase modulation attributable to the resting (non-spiking) neuron. This is done by first measuring the spatial phase modulation that the resting neuron imparts on the optical wavefront of a coherent light beam. A spatial light modulator (SLM), deformable mirror, or other phase cancellation device in the microscope applies a complementary spatial phase modulation to the coherent beam that passed through the neuron, canceling the spatial phase imparted by the resting neuron and thereby generating a flat optical wavefront. When subsequently imaging the same neuron during an action potential, the microscope measures only the spatial phase modulation attributable to the action potential on the otherwise flattened wavefront.

The flattened field arrives at an interferometer, which can be a Mach-Zehnder or a Michelson interferometer, where a beam splitter or other component splits the incoming flattened field into two beams. Additional phase control is implemented to modify the relative phase, $\Delta\phi$, between these two beams using phase modulators placed in the two paths.

Modulating the relative phase between the two beams changes the bias or DC offset of the interference signal at the output of the interferometer.

To image small phase variations on the camera, we introduce a spatial filter in the path of one of the beams within the interferometer. The spatial filter can be, e.g., a pinhole placed in the Fourier plane of the interferometer, a suitably actuated digital micromirror device (DMD), spatial light modulator (SLM) or other spatial filter arrangement which enables us to implement a low-pass filter of desired cut-off frequency for one beam while letting the other beam pass. The two beams recombine and interfere when leaving the interferometer. The total field arriving at the detector with respect to the spatial filter arrangement is given by $$E(x,y)=|E_1|e^{i[\phi 1(x,y)+\alpha(x,y)]}+|E_2|e^{i[\phi 2(x,y)]}$$

where (x, y) are the transverse axes of the detector; $|E_{1,2}|$ and $\phi_{1,2}$ are the amplitudes and phases, respectively, of the first and second beams; and a represents the spatial frequency shift induced by the spatial filter arrangement to the first beam.

By controlling the relative phase between the beams in the interferometer to be $\Delta\phi=\pi\pm\phi_{off}$, where $\phi_{off}$ is from about 10 µrad to about 10 mrad (e.g., about 10 µrad, 25 µrad, 50 µrad, 100 µrad (0.1 mrad), 0.2 mrad, 0.3 mrad, 0.4 mrad, 0.5 mrad, 1.0 mrad, 2.0 mrad, 3.0 mrad, 4.0 mrad, 5.0 mrad, 6.0 mrad, 7.0 mrad, 8.0 mrad, 9.0 mrad, or 10 mrad or any range between any of these values, e.g., 0.1-5 mrad), the camera operates in a low photon count regime in the absence of an optical signal related to the action potential. In other words, when the phase difference between the beams is shifted from π by at least ±0.1 mrad and by at most ±5 mrad, the camera operates in a sensitive regime.

This allows most of the dynamic range of the camera to capture phase signals in the range of 1 µrad to 0.1 mrad. For a high (e.g., 1.6-million-electron) well-depth camera, a $10^5$ photon count change corresponds to a 10 µrad phase change, which is sensitive enough to measure a single action potential.

Figure 1A:
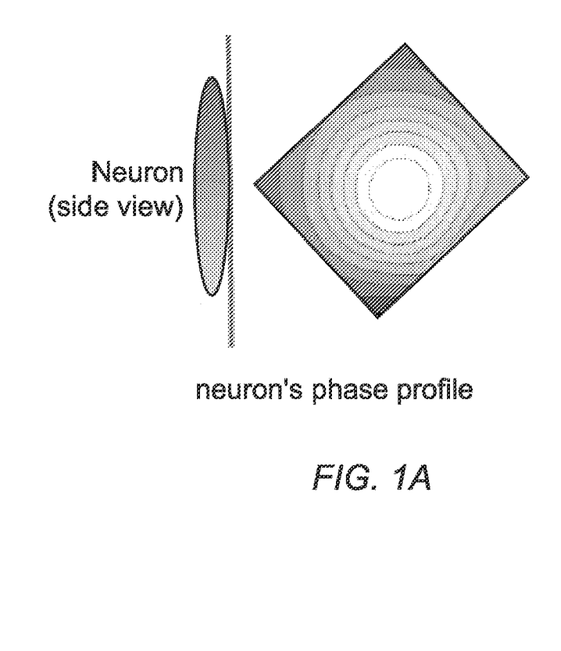
FIGS. 1A-1C illustrate flat wavefront generation. A resting excitable neuron (FIG. 1A) imparts a specific phase profile on an incident optical wavefront. A phase cancellation module, such as a spatial light modulator (SLM) or deformable mirror (DM), (FIG. 1B) cancels out this phase profile of the resting neuron to generate a flat optical wavefront (FIG. 1C).
Figure 1B:
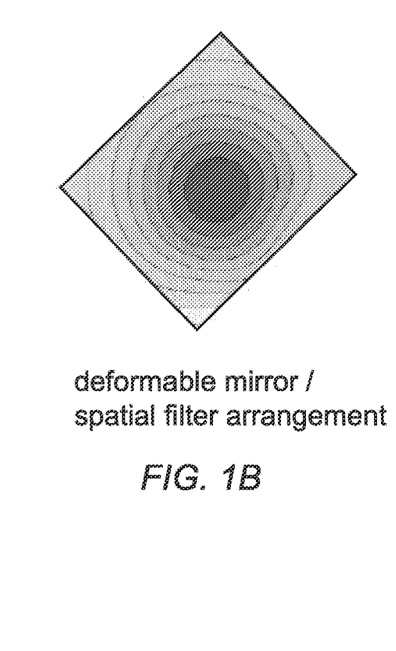
Figure 1C:
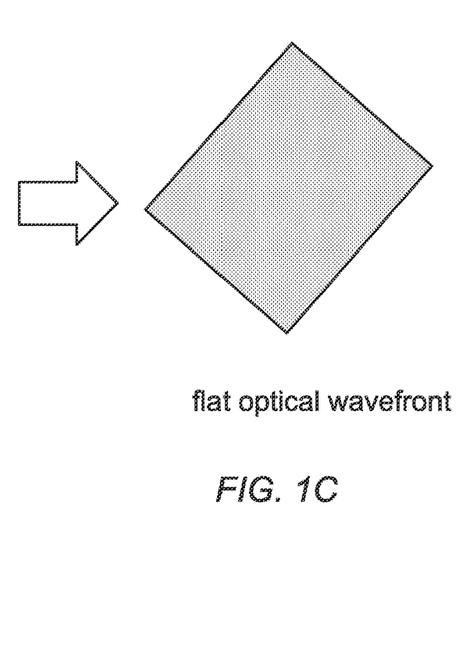

FIGS. 1A-1C illustrate the cancellation of phase modulation from a resting neuron. FIG. 1A shows a side view of a neuron (left), which is depicted as an oblate spheroid for simplicity. The neuron has a refractive index that is greater than the refractive index of the surrounding medium, which may be an extracellular matrix (e.g., a macromolecular network composed of proteins and polysaccharides); as a result, light propagating through the neuron travels along a longer optical path than light propagating through only the surrounding medium. When the neuron is resting (i.e., the membrane potential is about −70 mV) the optical path length mismatch produces a spatial phase modulation φ(x, y), shown schematically at right in FIG. 1A, where lighter shading indicates higher phase retardation. FIG. 1B shows the complementary spatial phase modulation −φ(x,y) that can be modulated on a beam propagating through the neuron with a deformable mirror, SLM or other suitable spatial phase modulator. If the neuron is at rest, this produces a flat optical wavefront shown in FIG. 1C.

Exciting the neuron causes the neuron's shape and/or refractive index to change. This changes the optical path length mismatch between the neuron and the surrounding medium, so a beam propagating through the neuron experiences a spatial phase modulation φ(x,y)+δφ(x,y). Modulating this beam with the complementary spatial phase modulation −φ(x,y) cancels the static phase modulation associated with the resting neuron and leaves the phase modulation due to the excitation, δφ(x,y). This phase modulation due to the action potential can be detected by interfering the phase-modulated beam with a reference beam at a camera or detector array with a high dynamic range and low noise.

Figure 2A:
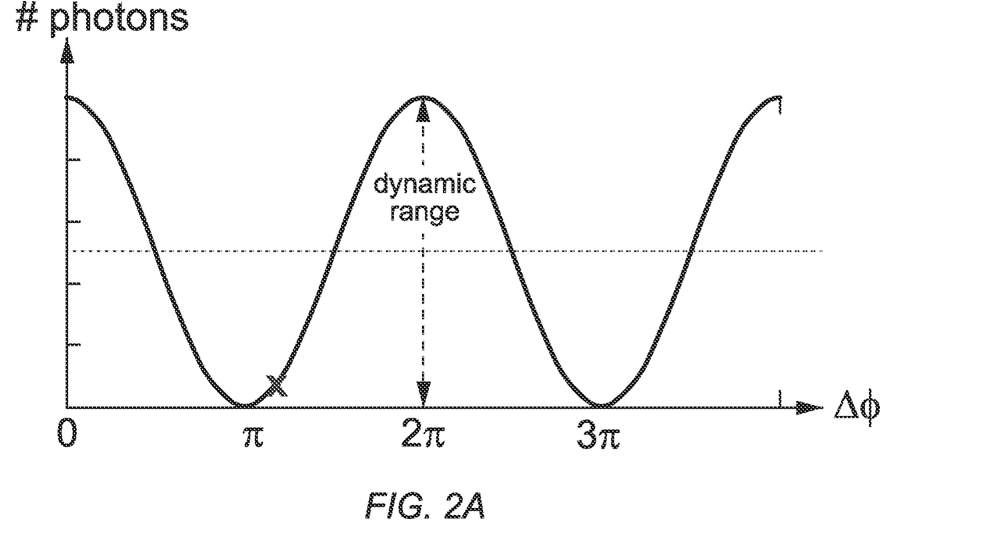
FIG. 2A is a plot of intensity, in number of photons, as a function of phase mismatch for a pair of interfering beams.

FIG. 2A shows schematically the intensity, given in number of photons, of an interferometric signal as a function of the relative phase, Δφ, between interfering beams as measured by one pixel or detector element of a camera or detector array. In a common path interferometer, the interfering beams have the same intensity, and interfere to produce a signal whose intensity varies as the cosine of the relative phase between the beams as shown in FIG. 2A. The signal arriving at the camera is given by $I=(E_1+E_2)^2=2E_0^2[1+\cos(\delta\phi+\Delta\phi)]$, where $E_1=E_2=E_0 \exp[i(\delta\phi+\Delta\phi)]$ are the reference and sample beams, respectively. Setting the initial relative phase between the beams to be close to π (e.g., π+5 mrad) when the neuron is resting makes it possible to use the full dynamic range of the detector for measuring changes in the interferometric signal due to the action potential. Neuronal firing (action potentials) can be detected with a phase change of about $10^{-6}$ µrad from this starting point.

Figure 2B:
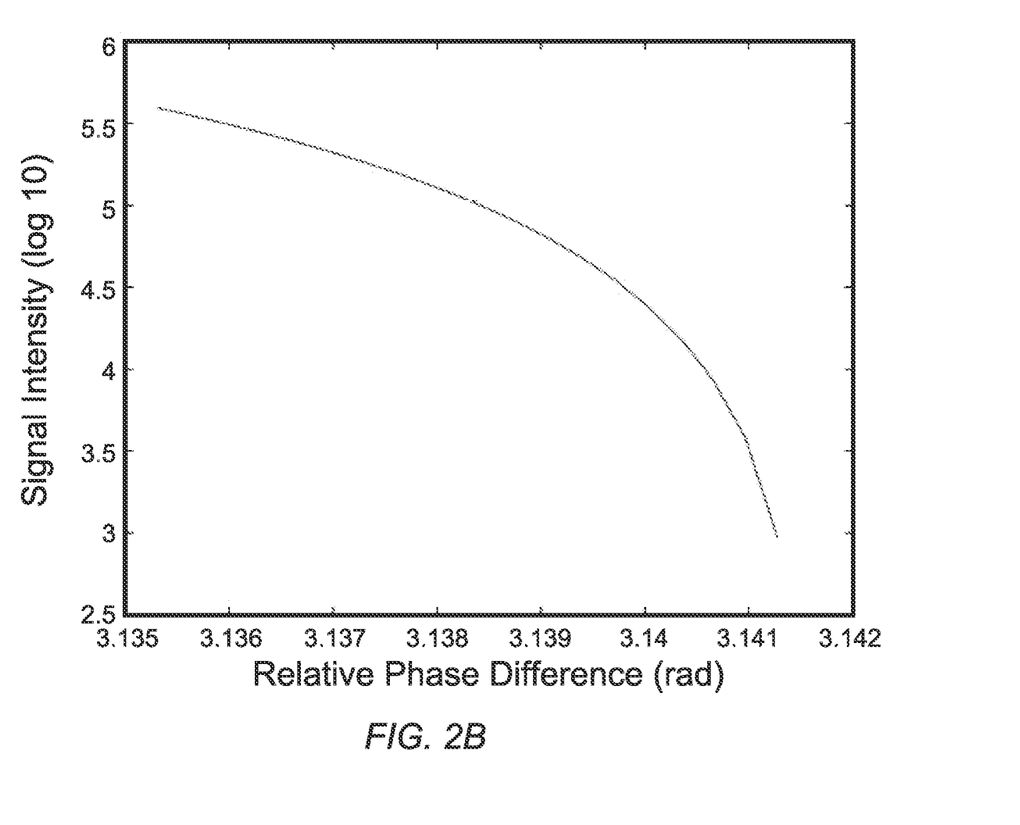
FIG. 2B is a plot of simulated signal intensity as a function of the relative phase difference between a pair of interfering beams.
Figure 2C:
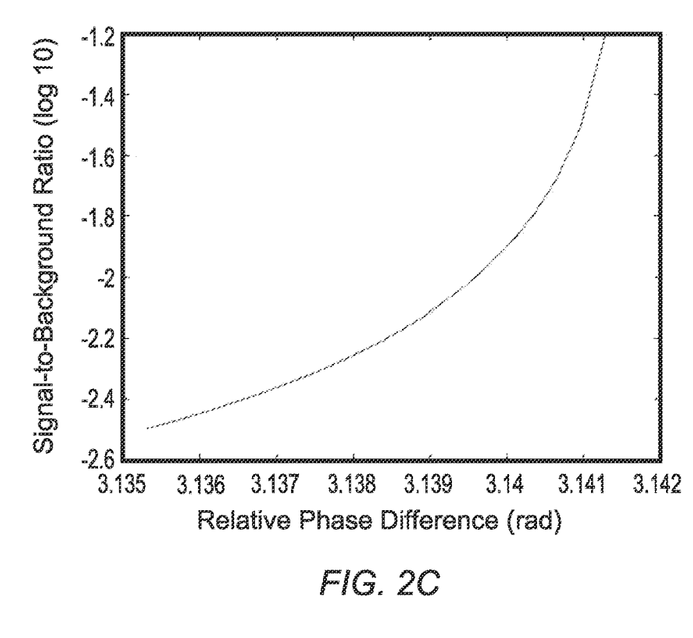
FIG. 2C is a plot of simulated signal-to-background ratio (SBR) as a function of the relative phase difference between a pair of interfering beams.
Figure 2D:
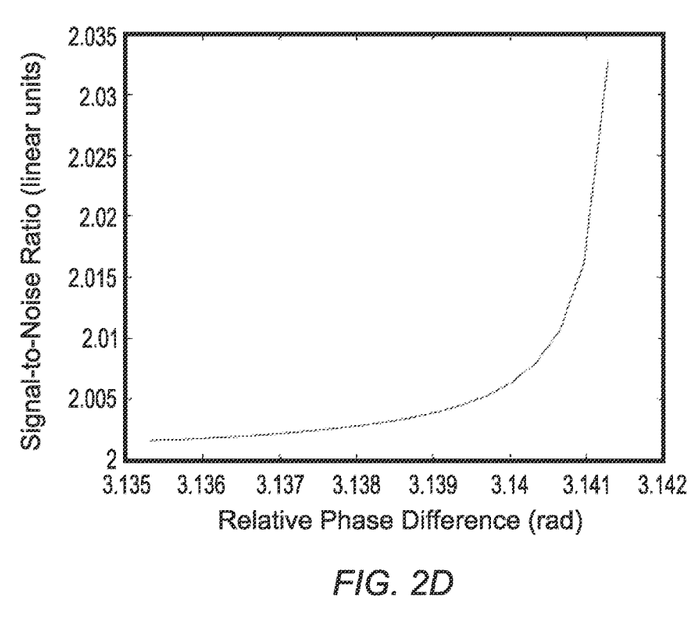
FIG. 2D is a plot of simulated signal-to-noise ratio (SNR) as a function of the relative phase difference between a pair of interfering beams.

FIGS. 2B-2D show different simulated measures of the detected intensity as a function of the relative phase between the beams. FIG. 2B shows the base 10 logarithm of the signal intensity, which is given by $$S=(E_1+E_2)^2=2E_0^2[1+\cos(\delta\phi+\Delta\phi)]$$

FIGS. 2C and 2B show the base 10 logarithm of the signal-to-background ratio (SBR) and signal-to-noise ratio (SNR) in linear units, respectively, where the background and noise are given as, respectively:

$$B=2E_0^2[1+\cos(\Delta\phi)]$$

$$N=\sqrt{2}E_0\sqrt{1+\cos(\delta\phi+\Delta\phi)}.$$

Figure 3A:
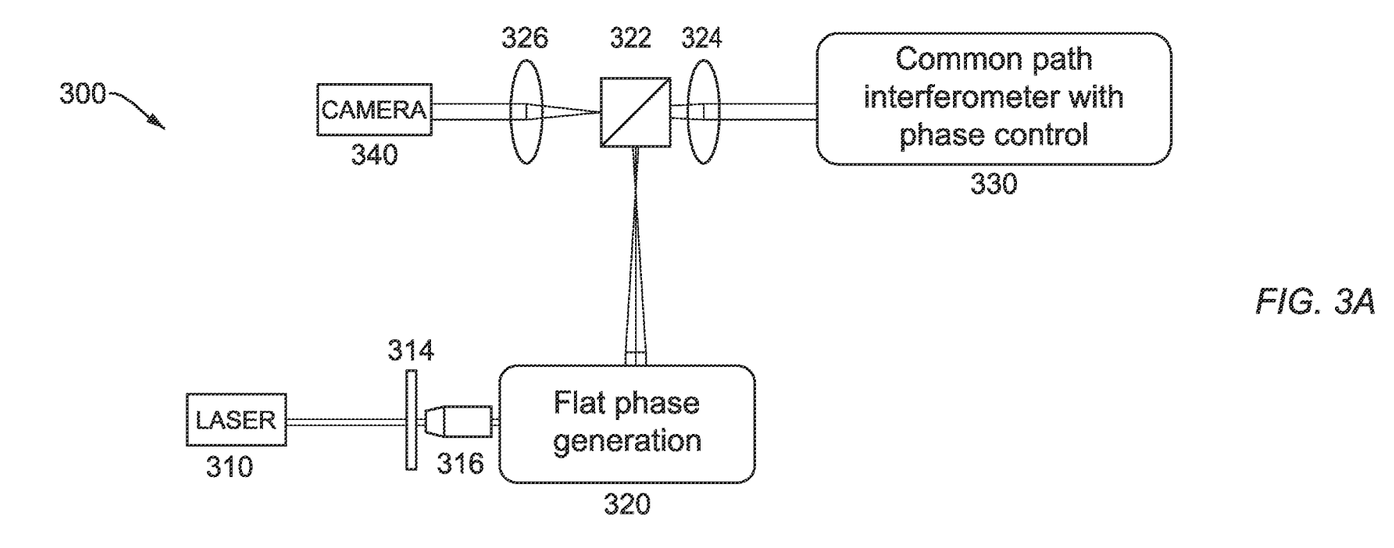
FIGS. 3A and 3B show a high-sensitivity phase cancellation microscope suitable for single-shot or real-time imaging of a neuronal action potential.
Figure 3B:
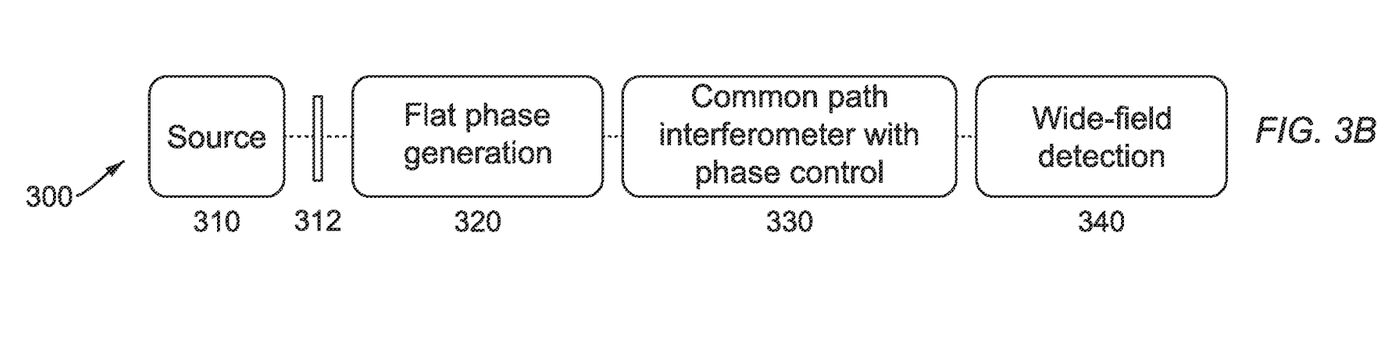

FIGS. 3A and 3B illustrate an example of our high-sensitivity phase cancellation microscope 300. The microscope 300 includes a coherent light source (here, a laser 310), an objective lens 316, a phase cancellation module 320, a common-path interferometer 330 with phase control between its arms, and a camera 340. In operation, the laser 310 illuminates a sample neuron 314 with a beam of collimated, coherent light. This beam propagates through the sample neuron 314, accumulating a spatially varying phase and amplitude modulation representing the sample neuron 314 and the surrounding medium.

The objective lens 316 directs the transmitted beam to the phase cancellation module 320, which flattens the phase of the beam's optical wavefront as discussed above with respect to FIGS. 1A-1C. When the neuron is at rest, the phase cancellation module 320 cancels substantially all of the spatial phase modulation picked up by the beam as it propagates through the sample 314. And when the neuron is undergoing an action potential, the phase cancellation module 320 cancels substantially all of the spatial phase modulation associated with the resting neuron, leaving the beam's optical wavefront with the spatial phase modulation due to the action potential. (The phase cancellation module 320 can also be placed elsewhere, e.g., between the laser 310 and neuron 314 and actuated in a similar fashion.)

A beam splitter 322 and lens 324 direct the flattened wavefront to the common-path interferometer 330, which splits the beam into two beams and introduces a phase delay between the two beams. These two beams propagate back through the lens 324, beam splitter 322, and another lens 326 to the camera 340, where they interfere to produce a spatial intensity pattern whose period depends on the spatially varying phase modulation that the beam accumulated while propagating through the sample 314.

Figure 4A:
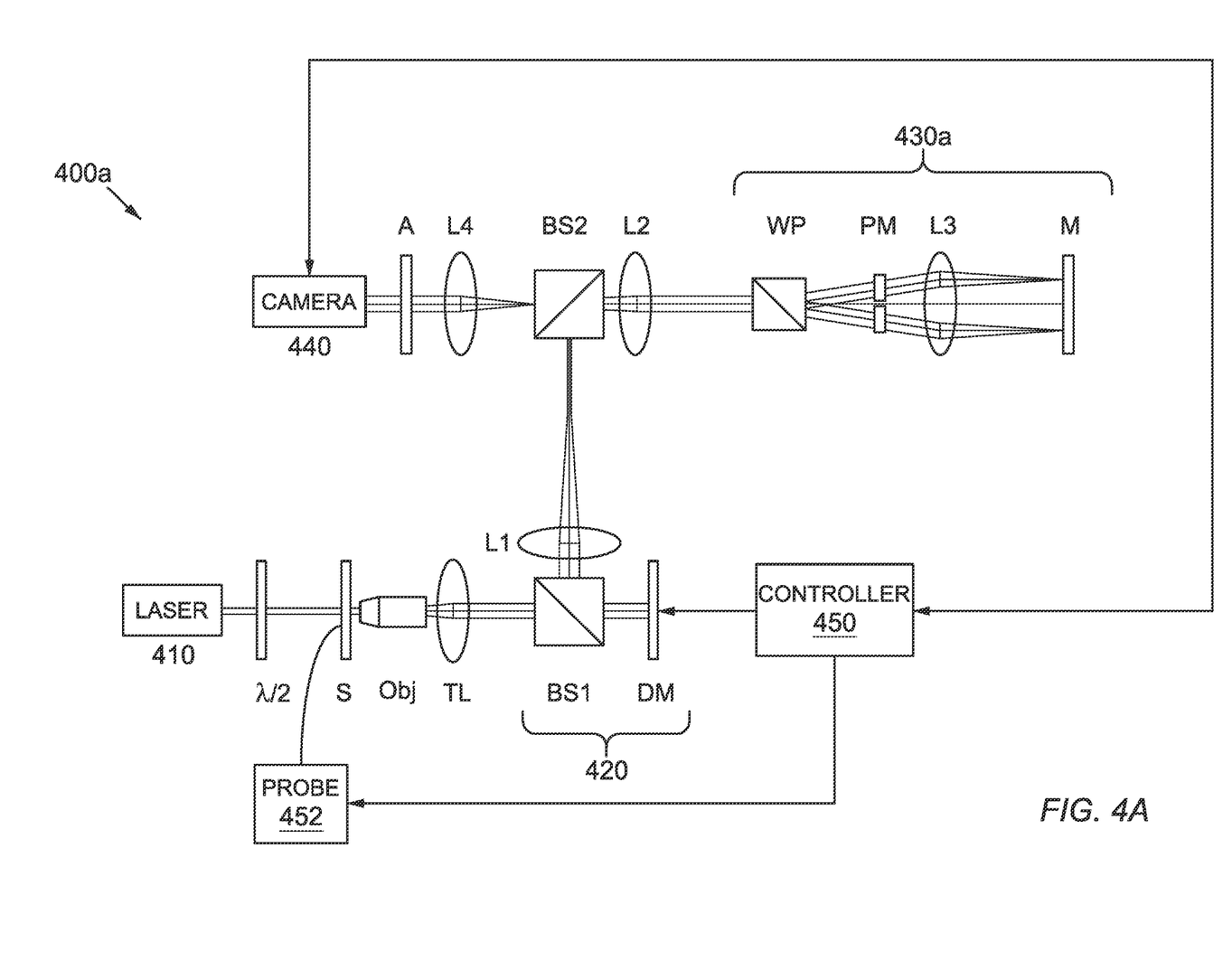
FIG. 4A shows a high-sensitivity phase cancellation microscope suitable for single-shot or real-time imaging of a neuronal action potential.

FIG. 4A is a more detailed diagram of a high-sensitivity interferometric microscope 400. A half-wave plate, linear polarizer assembly λ/2, generates a 450 polarized beam from a laser 410 to illuminate a sample neuron S, which can be stimulated optically or electrically with a probe 452. The probe 452 delivers this stimulation via a thin electrical lead or optical fiber that is in electromagnetic communication with the neuron S as shown in FIG. 4A. The laser wavelength can be 532 nm or longer, with longer wavelengths allowing for higher laser power due to lower absorption by the sample. The laser 410 can be a continuous-wave (cw) laser that illuminates the neuron S continuously or a pulsed laser that illuminates the neuron S with pulses of light in synchronization with stimulation of the neuron S by the probe 452.

An objective Obj (e.g., with 10×, 40× magnification and a Numerical Aperture (NA)=0.4, 0.8) collects the transmitted light and projects it onto a deformable mirror DM (SLM), placed in the conjugate image plane via a tube lens TL and a first beam splitter BS1. Together, the first beam splitter BS1 and the deformable mirror DM form a phase cancellation module 420 that is controlled by a controller 450, such as a computer or other processor. The controller 450 can determine the spatial phase profile of the resting neuron from a phase measurement by the microscope when the deformable mirror DM is flat (i.e., not actuated) and use that measurement to determine the complementary phase profile to impart with the deformable mirror DM (SLM) in order to cancel the resting neuron's spatial profile from a beam. Before the microscope 400 measures an action potential, the controller 450 actuates the deformable mirror DM (SLM) to reflect a beam with a flatter phase profile, thereby increasing the dynamic range of detection.

The first beam splitter BS1 directs the reflected beam to a second beam splitter BS2 in a 4-f system including lenses L1 and L2. Lens L2 images the deformable mirror plane onto a Wollaston prism WP in a common path interferometer 430a. The Wollaston prism WP splits the incoming light into two orthogonally polarized beams (vertical and horizontal polarizations). The two beams pass through respective phase modulators PM and through another lens L3. Each phase modulator PM may be, e.g., a glass plate that can be twisted or rotated to change the optical path length of the corresponding interferometer arm. The phase-delayed beams reflect off a reflective spatial filter M (e.g., a suitably actuated spatial light modulator) in the Fourier plane of lens L3. The spatial filter M removes high spatial frequencies from one of the beams in order to generate a plane wave for the transmitted spatial frequency portion at the camera detection plane for interference. The phase modulators PM allow control of the relative phase, $\Delta\phi$, between the two beams. These beams recombine in the Wollaston prism WP conjugate plane and travel collinearly through another 4-f system formed by lenses L2 and L4 onto a camera 440 (e.g., a 1.6-million-electron well-depth camera). Since the two beams are orthogonally polarized, an analyzer A oriented at 45° is placed before the camera 440 for interferometric detection. (The controller 450 uses the camera output to generate a single-shot phase image of the action potential.)

Figure 4B:
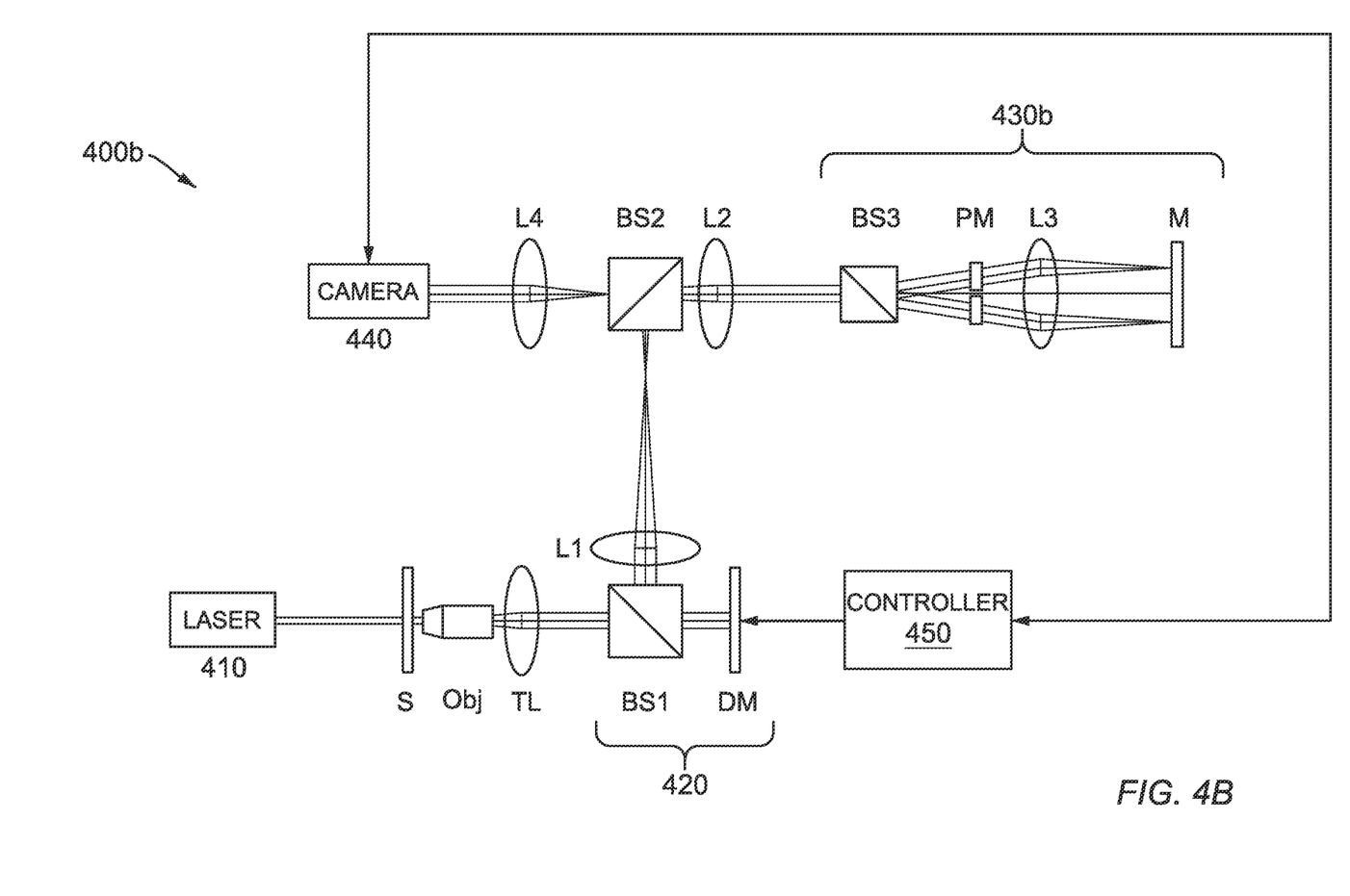
FIG. 4B shows a high-sensitivity phase cancellation microscope with a beam splitter-based interferometer.
Figure 4C:
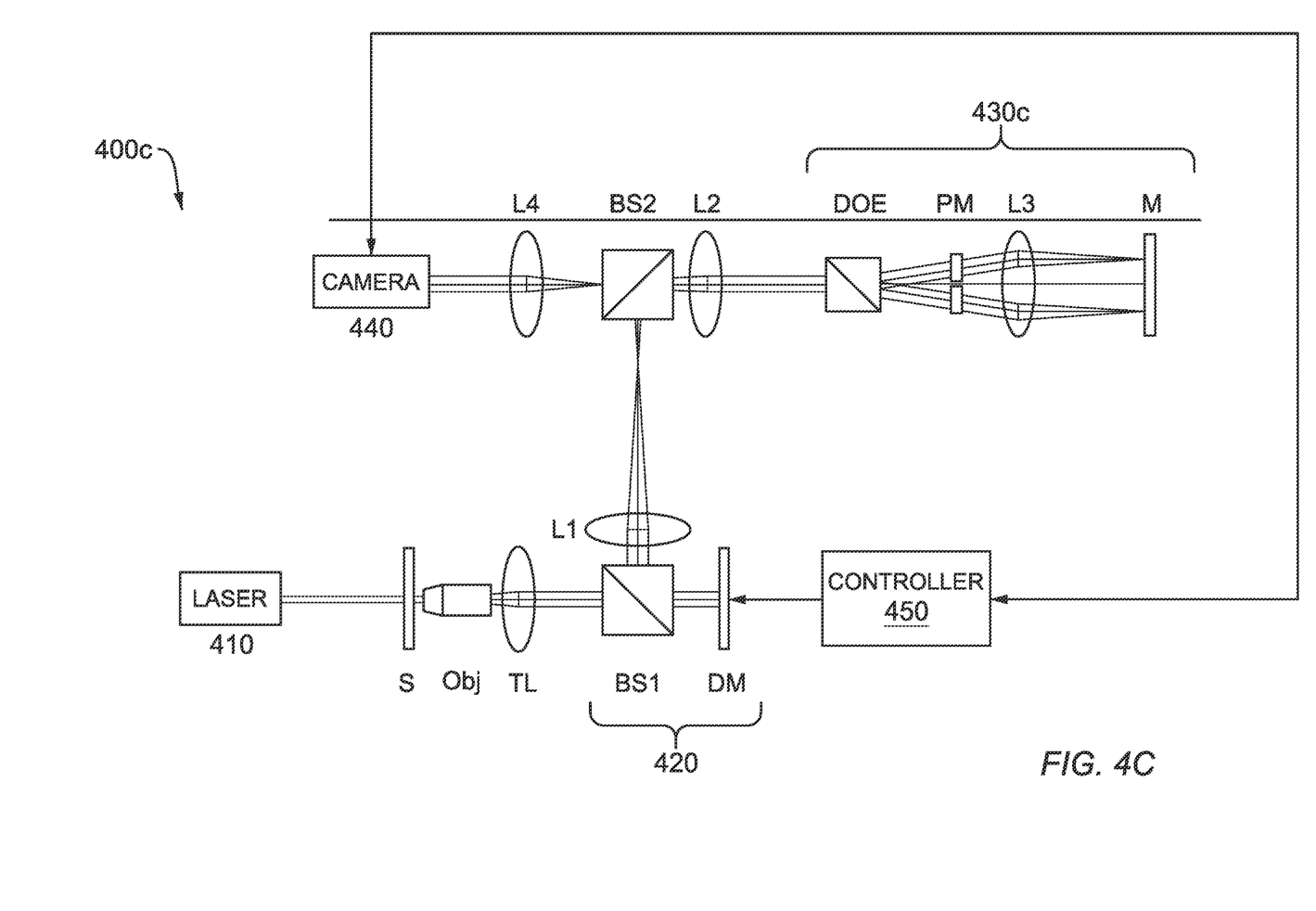
FIG. 4C shows a high-sensitivity phase cancellation microscope with a diffractive optical element (DOE)-based interferometer.

FIGS. 4B and 4C show alternative versions of the microscope 400a in FIG. 4A. In the microscope 400b of FIG. 4B, the Wollaston prism WP is replaced by a simple beam splitter BS3 in the common-path interferometer 430b. While the beam splitter BS3 could lead to a loss of 75% of the light, it would make it possible to eliminate the analyzer A before the camera 440.

In the microscope 400c of FIG. 4C, the Wollaston prism WP is replaced by a diffractive optical element DOE in the common-path interferometer 430c. The diffractive optical element DOE generates two beams (going from left to right in FIG. 4C) and combines two beams into a single beam (from the right). Any analyzer can be eliminated from this microscope 400c since both the beams coming back from the interferometer 430c can have the same polarization.

Figure 5:
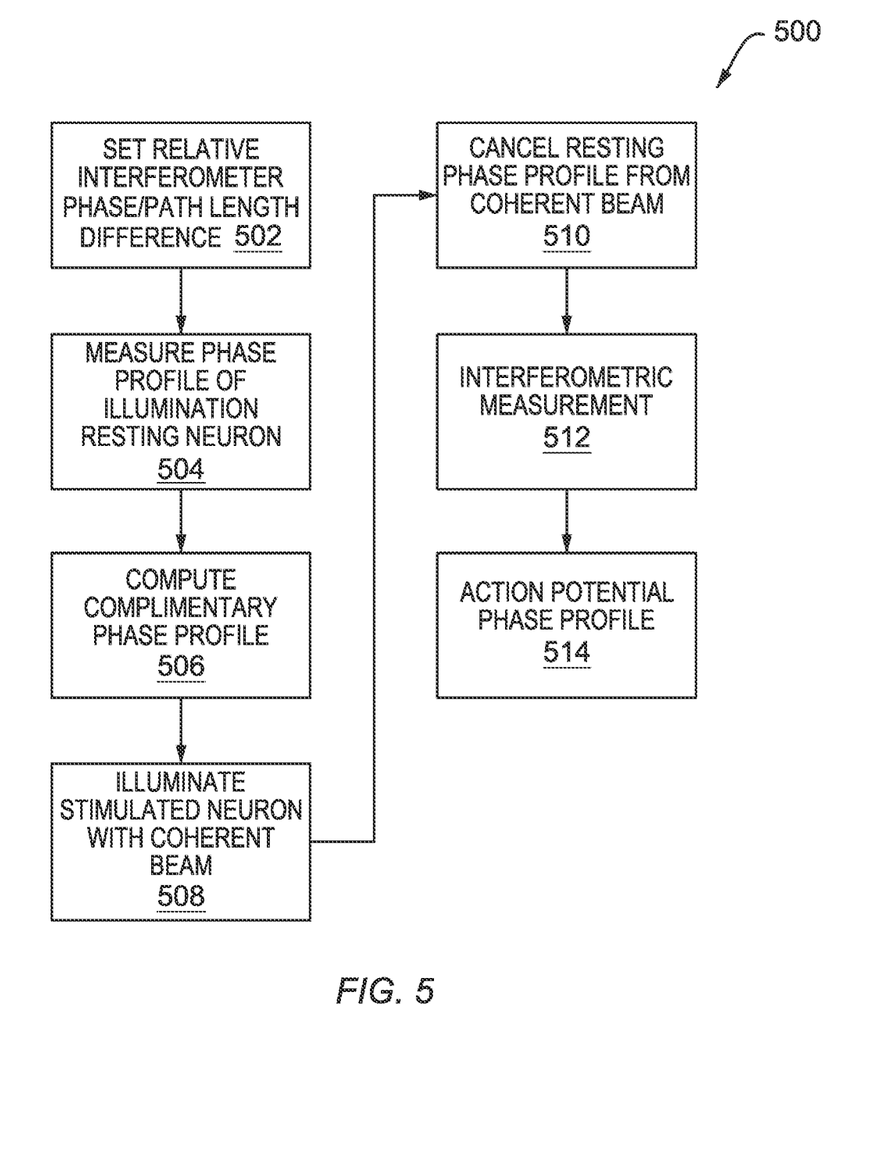
FIG. 5 illustrates a process for imaging the phase of a neuronal action potential in a single-shot.

FIG. 5 shows a process 500 for acquiring a phase image of an action potential in a single shot using the microscope 400 shown in FIG. 4 or another similar microscope. The process 500 begins with adjusting the phase modulators PM in the interferometer arms so that the interferometric signal sensed by the camera is biased at the desired point (e.g., at a null or quadrature point as shown in FIG. 2A) (502). Once the phase modulators PM have been adjusted, the microscope acquires the spatial phase profile of the resting neuron (502). This can be done using the microscope 400 with the deformable mirror DM in a flat, unactuated state or another known state (504). The controller 450 or another suitable processor computes the complement of the spatial phase profile of the resting neuron from the measurement (506).

Neurons can produce an action potential ('spike') spontaneously or can be stimulated to spike. Stimulated spiking allows for temporal onset control of the spiking and can be achieved, e.g., via electrical stimulation or optical stimulation (for optogenetically modified neurons) by the stimulation probe 452. For example, the controller 450 can command the probe 452 to stimulate the neuron, causing the neuron to spike. The laser 410 illuminates the spiking neuron with coherent light (508) to produce a beam whose wavefront has been spatially phase (and amplitude) modulated by the neuron (508). The controller 450 actuates the deformable mirror DM (SLM) to cancel the spatial profile of the resting neuron from this modulated wavefront (510), which is then subject to an interferometric measurement using the common-path interferometer 430 and the detector 440 (512) in a single shot. (The controller 450 uses this measurement to generate a phase image of the action potential (514).)

Depending on the measurement, the camera 440 can run continuously or in a triggered mode. In the continuous mode, the laser 410 illuminates the neuron with a cw beam and the camera 440 records images of the neuron while it is resting and spiking as the spiking occurs, either spontaneously or in response to electrical or optical stimulation with the probe 452. In the triggered mode, the camera 440 captures frames in synchronization with electrical or optical stimulation by the probe 452, e.g., right before stimulation (while the neuron is resting) and right after stimulation (while the neuron is spiking). In triggered mode, the laser 410 can illuminate the neuron with a cw beam or with pulses that are synchronized with the stimulation by the probe 452, e.g., in response to control signals or pulses from the controller 450. In either mode, the camera frame rate can be 1 kHz or higher (e.g., 5 kHz, 10 kHz, 15 kHz, or 20 kHz).

The steps of the process 500 can be performed in different orders. For example, the relative phase difference between the interferometer arms (502) can be set or adjusted during or after measuring the resting neuron's phase profile (504). Likewise, the resting neuron's phase profile can be canceled from the coherent beam (508) before the coherent beam illuminates the neuron (506) instead of after.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:
1. A microscope comprising:
a light source to illuminate a neuron exhibiting an action potential;
a spatial phase modulator, in optical communication with the neuron, to modulate a wavefront of light transmitted by the neuron with a spatial phase modulation selected to cancel spatial phase modulation of the wavefront by the neuron in the absence of the action potential;

a beam-splitting element, in optical communication with the spatial phase modulator, to split the wavefront into a first beam and a second beam;

a phase modulator, in optical communication with the beam-splitting element, to modulate a relative phase between the first beam and the second beam; and a detector, in optical communication with the phase modulator, to detect interference between the first beam and the second beam, the interference representing the action potential.

2. The microscope of claim 1, wherein the beam-splitting element forms part of a common-path interferometer.

3. The microscope of claim 2, further comprising:
a spatial filter, in optical communication with at least one component of the common-path interferometer, to spatially filter the first beam.

4. The microscope of claim 3, wherein the spatial filter is a low-pass spatial filter.

5. The microscope of claim 1, wherein the beam-splitting element comprises at least one of a Wollaston prism, a beam splitter, or a diffractive optical element.

6. The microscope of claim 1, wherein the phase modulator is configured to set a relative phase between the first beam and the second beam to an absolute value of between $|\pi \pm 10 \;\mu rad|$ and $|\pi \pm 10 \;mrad|$.

7. The microscope of claim 1, wherein the detector has a well depth of at least 1 million electrons per pixel.

8. The microscope of claim 1, wherein the detector operates at a frame rate of 1 kHz to 20 kHz.

9. The microscope of claim 1, wherein the spatial phase modulator comprises at least one of a spatial light modulator or a deformable mirror.

10. The microscope of claim 1, further comprising:
a probe, in electromagnetic communication with the neuron, to stimulate the neuron to exhibit the action potential.

11. A method of imaging an action potential in a neuron in real time, the method comprising:
illuminating the neuron with a wavefront of light while the neuron is undergoing the action potential;
modulating the wavefront transmitted through the neuron with a spatial phase modulation selected to cancel a spatial phase modulation imparted by the neuron in the absence of the action potential;
splitting the wavefront into a first beam and a second beam;
modulating a relative phase between the first beam and the second beam; and
detecting interference of the first beam and the second beam, the interference representing a phase change due to the action potential.

12. The method of claim 11, wherein modulating the relative phase between the first beam and the second beam comprises setting the relative phase to an absolute value of between $|\pi \pm 10 \;\mu rad|$ and $|\pi \pm 10 \;mrad|$.

13. The method of claim 11, wherein detecting the interference comprises sensing an intensity change corresponding to a phase difference, caused by the action potential, of about 1 μrad to about 0.1 mrad.

14. The method of claim 11, further comprising:
spatially filtering the first beam before detecting the interference of the first beam and the second beam.

15. The method of claim 11, further comprising:
stimulating the neuron to undergo the action potential.

16. The method of claim 11, further comprising:
allowing the neuron to undergo the action potential spontaneously.

17. The method of claim 11, further comprising, before illuminating the neuron with a wavefront of light while the neuron is undergoing the action potential:
illuminating the neuron with another wavefront of light in the absence of the action potential;
detecting the spatial phase modulation imparted by the neuron in the absence of the action potential; and
determining the spatial phase modulation selected to cancel a spatial phase modulation imparted by the neuron in the absence of the action potential based on the spatial phase modulation imparted by the neuron in the absence of the action potential.

18. A microscope comprising:
a continuous-wave laser to illuminate a neuron exhibiting an action potential with a continuous-wave laser beam;
a spatial phase modulator, in optical communication with the neuron, to modulate a wavefront of the continuous-wave laser beam transmitted by the neuron with a spatial phase modulation selected to cancel spatial phase modulation of the wavefront by the neuron in the absence of the action potential;
a common-path interferometer in optical communication with the spatial phase modulator, the common-path interferometer comprising:
a beam-splitting element to split the continuous-wave laser beam into a first beam and a second beam;
a phase modulator, in optical communication with the beam-splitting element, to set a relative phase between the first beam and the second beam to an absolute value of between $|\pi \pm 10 \;\mu rad|$ and $|\pi \pm 10 \;mrad|$; and
a spatial filter, in one arm of the common-path interferometer, to spatially low-pass filter the first beam; and
a detector, in optical communication with the common-path interferometer and having a well depth of at least $10^6$ electrons per pixel and a frame rate of at least 1 kHz, to detect interference between the first beam and the second beam, the interference representing a phase change of about 1 μrad to about 0.1 mrad caused by the action potential.

19. The microscope of claim 18, wherein the spatial phase modulator comprises at least one of a spatial light modulator or a deformable mirror.

20. The microscope of claim 18, further comprising:
a probe, in electromagnetic communication with the neuron, to stimulate the neuron to exhibit the action potential.

* * * * *